United States Patent [19]

Lupke

[11] Patent Number: 5,023,029
[45] Date of Patent: Jun. 11, 1991

[54] METHOD AND APPARATUS FOR PRODUCING PIPE WITH ANNULAR RIBS

[76] Inventor: Manfred A. A. Lupke, 10 McLeary Ct., Concord, Canada, L4K 2Z3

[21] Appl. No.: 405,777

[22] Filed: Sep. 11, 1989

[30] Foreign Application Priority Data

Sep. 16, 1988 [CA] Canada .................................. 577653

[51] Int. Cl.⁵ .............................................. B29C 47/22
[52] U.S. Cl. .................................. 264/40.5; 264/40.7;
 264/508; 264/167; 425/326.1; 425/393;
 425/396; 425/465; 425/466
[58] Field of Search ...................... 264/40.3, 40.7, 508,
 264/505, 515, 566–568, 173, 40.5, 167;
 425/133.1, 131.1, 393, 396, 388, 465, 466, 326.1

[56] References Cited

U.S. PATENT DOCUMENTS

| | | |
|---|---|---|
| 3,209,404 | 10/1965 | Hagen .................................. 425/466 |
| 3,280,847 | 10/1966 | Chisholm et al. .................... 425/466 |
| 3,891,007 | 6/1975 | Kleykamp . |
| 3,981,663 | 9/1976 | Lupke . |
| 4,136,143 | 1/1979 | Lupke et al. . |
| 4,165,214 | 8/1979 | Lupke et al. . |
| 4,199,314 | 4/1980 | Lupke et al. . |
| 4,218,164 | 8/1980 | Lupke et al. . |
| 4,226,580 | 10/1980 | Lupke et al. . |
| 4,365,948 | 12/1982 | Chaplain . |
| 4,500,284 | 2/1985 | Lupke . |
| 4,510,013 | 4/1985 | Lupke et al. . |
| 4,534,923 | 8/1985 | Lupke . |
| 4,553,923 | 11/1985 | Lupke . |
| 4,710,337 | 12/1987 | Nordstrom . |
| 4,712,993 | 12/1987 | Lupke . |
| 4,721,594 | 1/1988 | Jarvenkyla . |
| 4,770,618 | 9/1988 | Lupke . |
| 4,846,660 | 7/1989 | Drossbach ...................... 425/326.1 |
| 4,865,797 | 9/1989 | Jarvenkyla ........................ 264/167 |
| 4,867,928 | 9/1989 | Jarvenkyla et al. ................ 425/393 |
| 4,900,503 | 2/1990 | Hegler et al. ...................... 425/393 |

FOREIGN PATENT DOCUMENTS

| | | |
|---|---|---|
| 0315012A2 | 4/1986 | European Pat. Off. . |
| 3725286A1 | 5/1986 | Fed. Rep. of Germany . |
| 55-32609 | 3/1980 | Japan .................................. 264/173 |
| F18600072 | 3/1986 | PCT Int'l Appl. . |

*Primary Examiner*—Jeffery Thurlow
*Attorney, Agent, or Firm*—Leydig, Voit & Mayer

[57] ABSTRACT

The invention concerns apparatus for molding thermoplastic tubing having solid annular ribs. The apparatus is of the type where a tubular mold is defined by cooperatively interengaged mold block of a pair of mold assemblies. An annular extrusion orifice for the tube extends into the mold tunnel and tubing is extruded about a mandrel. The invention provides an accumulator chamber in the region of the extrusion nozzle to provide for pressure differences which build up at that point. Thus, the effective volume of the accumulator chamber can compensate for the varying requirement for the thermoplastic material resulting from the varying radial wall thickness.

16 Claims, 5 Drawing Sheets

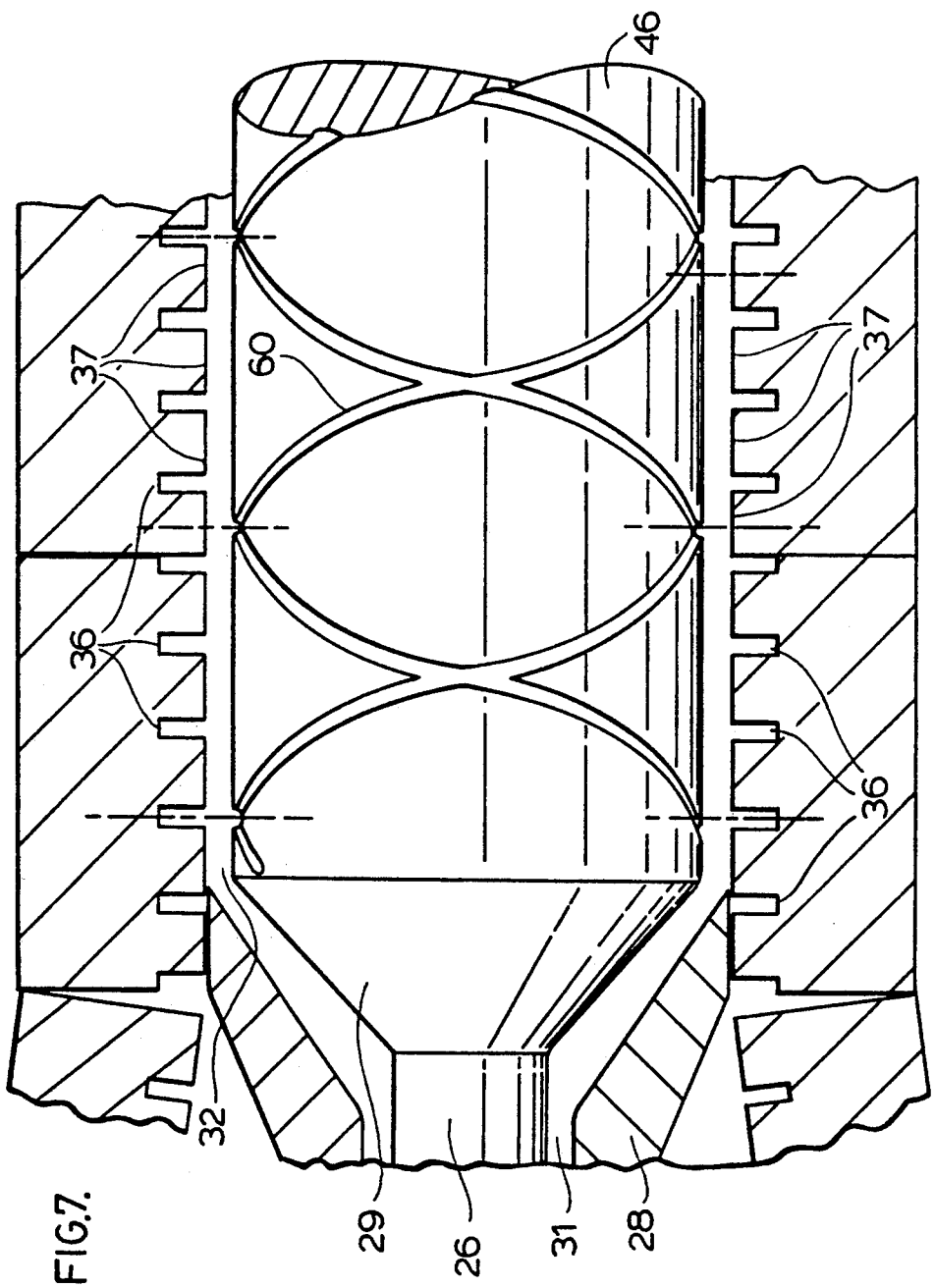

METHOD AND APPARATUS FOR PRODUCING PIPE WITH ANNULAR RIBS

BACKGROUND OF THE INVENTION

1. Field of the Invention

This invention relates to the apparatus for thermoplastic tubing having annular ribs, the apparatus being of the type in which tubing of the thermoplastic material is continuously extruded into a tubular mold tunnel.

2. Background of the Invention

The tubular mold tunnel is defined by cooperatively interengaged and mold blocks of a pair of mold assemblies, the mold blocks of each mold assembly being driven along a forward run in which the blocks define the modular block tunnel, and back along a return run. The mold blocks have molding surfaces comprising troughs for molding ribs of the tubing, and crests for molding grooves of the tubing. Such an apparatus is disclosed for example in U.S. Patent No. 3,981,663 issued on Sept. 21, 1976 to Gerd P.H. Lupke, and in 4,712,993 issued on Dec. 15, 1987 to Manfred A.A. Lupke.

With such known apparatus, the annular extrusion orifice is defined by a nozzle and conical mandrel disposed coaxially within the nozzle and connected to a downstream cylinder or sleeve which functions to guide the molten thermoplastic material toward the mold cavity and to provide the smooth inner surface of the pipe. In the apparatus described in the U.S. Pat. Specification No. 3,998,579, the sleeve is disposed a considerable distance downstream from the nozzle with the result that the molding space defined by the nozzle, the mandrel and the sleeve has an excessive volume. In the use of such known apparatus, the thermoplastic material is cooled excessively and becomes too stiff to flow into the rib recesses in the mold blocks. This problem cannot easily be avoided by raising the temperature of the material since that presents a serious risk that the material might burn. Polyvinylchloride (PVC) is a very useful thermoplastic material for forming pipes and this material will disintegrate if the temperature is raised too high.

In an attempt to avoid this problem, it has been proposed to reduce the axial extend of the extrusion orifice to such an extent that it is less than the distance between two adjacent annular recesses in the mold blocks, i.e. the extrusion orifice has an axial length less than the space between two annular ribs on the product pipe. While this procedure avoids cooling and flow problems associated with the use of large molding volumes, another problem arises due to the variation in the requirement of plastic material during operation of the apparatus. This variation results from the different thicknesses of pipe wall required for ribs and for the grooves. Thus, a considerable amount of thermoplastic material is required to fill the annular troughs in the mold blocks to form the ribs of the tubing. Less material is required at the crests of the mold blocks for the thinner walled grooves of the tubing. This calls for a very critically controlled flow of plastic material which is difficult to achieve. Even when the flow is satisfactory, pulsed stresses are set up at the Point of filling the mold blocks due to the varying demand for plastic material.

SUMMARY OF THE INVENTION

An attempt has been made to reduce the criticality of flow of the plastic material and to reduce the variation in pressure stresses set up by variations in requirements for molding material.

Thus, according to the invention is provided a method for extruding seamless plastic tubing having a radial wall thickness which varies along the length of such tubing which method comprises extruding a thermoplastic material at a predetermined rate to a pressure compensating chamber having an open face for the discharge of said plastic material therefrom into an axially advancing mold having axially separate radially outwardly extending recesses, and allowing the effective volume of said chamber to vary under varying requirements for thermoplastic material to compensate for the resulting from said varying radial wall thickness.

Also provided according to the invention is in an apparatus :or producing thermoplastic tubing having annular solid ribs spaced from one another by grooves, the apparatus comprising a pair of complementary mold assemblies each comprising an endless chain of articulately interconnected mold blocks driven in synchronism with the mold blocks of the other mold assembly along a forward run and back along a return run, the mold blocks cooperating in pairs along said forward run to provide an axially advancing tubular mold tunnel having a corrugated wall defined by alternating crests and troughs in the mold-defining faces of the mold blocks, extrusion means disposed at the entrance to the mold tunnel for extruding a tube of thermoplastic material, and means for urging said tube outwardly against said corrugated wall, the improvement in which A pressure compensating chamber is provided open to said corrugated wall, said chamber being located to receive thermoplastic material from the extrusion means and to discharge said thermoplastic material into said mold tunnel; and means for allowing the effective volume of said accumulator chamber to vary under varying thermoplastic material requirement to compensate for the varying requirement for the thermoplastic material for molding the pipe ribs in the troughs and for molding the pipe grooves at the crests.

BRIEF DESCRIPTION OF THE INVENTION

Several embodiments of the invention will now be described, by way of example, with reference to the accompanying drawings, in which:

FIG. 7 is an enlarged partly sectional view of a detail of apparatus including a third embodiment of the invention.

DETAILED DESCRIPTION OF PREFERRED EMBODIMENTS

Figure 1:
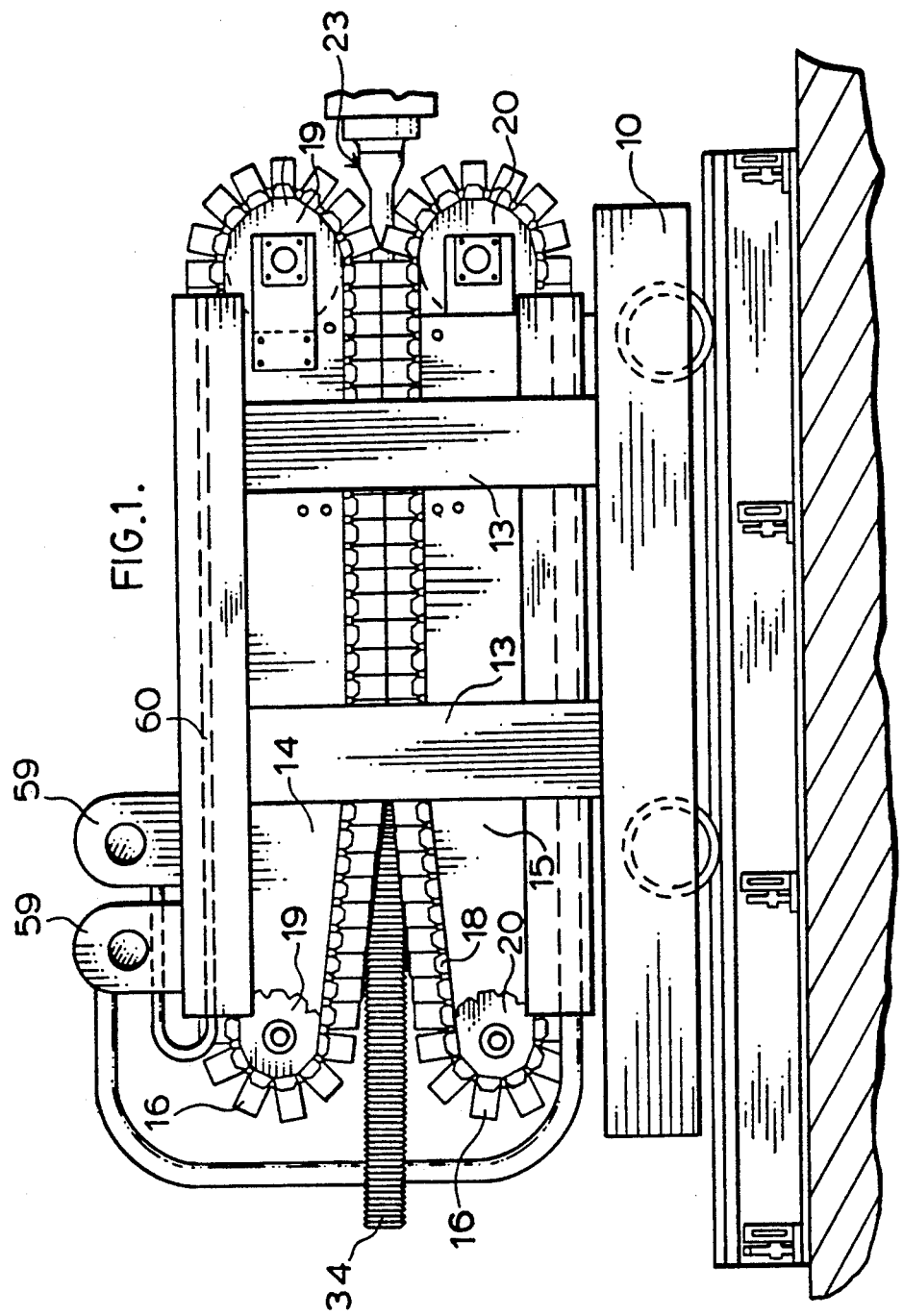
FIG. 1 is a side view of the apparatus of the general type which may be used.
Figure 2:
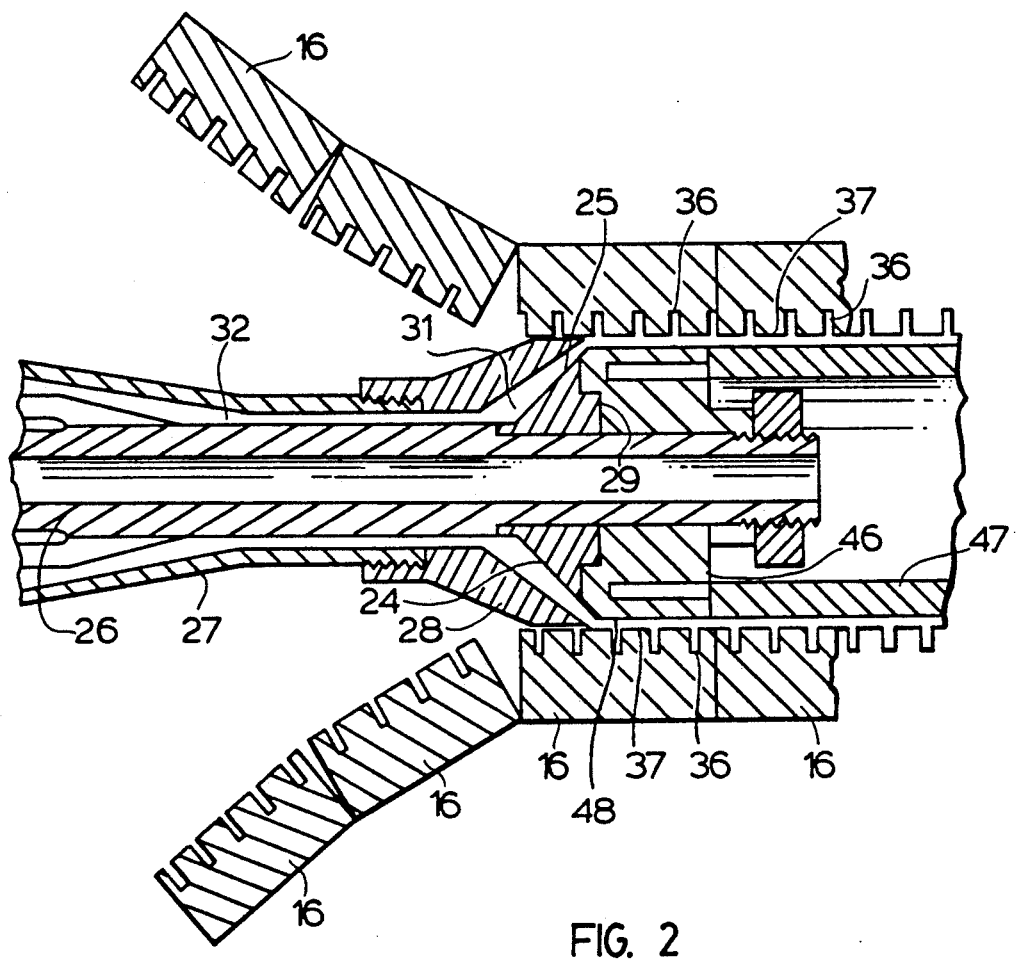
FIG. 2 (prior art) is a sectional view of a detail of an apparatus as shown in FIG. 1 in the region of a conventional extrusion nozzle.

Referring to the drawings and more particularly to FIG. 1 thereof, the apparatus comprises a carriage 10 supporting a pair of complementary upper and lower mold assemblies 14 and 15 respectively. Each mold assembly 14 and 15 comprises an endless chain of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed links of these chains. The mold assembly 15 likewise further comprises a pair of endless conveyor chains (only one of which is shown in the drawings and is denoted by the reference number 18), with each mold block 16 of the assembly 15 extending transversely between opposed links of this pair of chains including the chain 18. The chains are entrained around drive sprokets 19 and 20, with drive means (not shown) being connected to at least one of the sprockets 19 and at least one of the sprockets 20 for operatively driving the mold blocks 16 of each assembly 14 and 15 in synchronism along forward run and back along a return run, the mold blocks 16 of the assemblies 14 and 15 cooperating in pairs along the forward run to define an axially extending tubular mold tunnel.

By means of the carriage 10 the mold assemblies 14 and 15 may be operatively positioned to locate an extrusion head 23 being operatively coupled to the nozzle of an extrusion machine, which may be of conventional form. If required, the mold assemblies 14 and 15 can be moved away from the extrusion head 23 by movement of the carriage 10 in order to provide access to the extrusion head 23.

The extrusion head 23 comprises an axially extending tubular portion 26 which is surrounded in spaced relationship thereto by a tubular member 27, one end portion of which screw-threadedly supports an outer member 28 of an annular extrusion nozzle. The tubular portion 26 carries an inner member 29 of the extrusion nozzle having a frusto-conical surface 25. Between inner member 29 and outer member 28 is an annular passage 30 of generally frusto-conical form which terminates in annular orifice 31 and which communicates with the annular space 32 between the tube 27 and the portion 26 of the member 25. This annular space 32, in turn, communicates with the nozzle of the extrusion machine (not shown) passing the thermoplastic material, such as PVC to the extrusion nozzle formed by members 28 and 29.

Downstream of the extrusion nozzle 24 the extrusion head 23 carries a generally cylindrical forming plug 46 having an outer surface 48. The plug 46 is effective to cause thermoplastic material leaving the extrusion nozzle 24 to be molded by mold blocks 16. In particular, plug 46 forces thermoplastic material into troughs 36 of the mold blocks 16 to form annular ribs on the outer surface of the resulting pipe. Downstream of plug 46 is a cooling plug 47 which is tubular in form and may be cooled by any conventional means to aid setting of the thermoplastic pipe.

When the outer surface 48 of plug 46 conforms closely to the inner diameter of the mold tunnel, it is very difficult to provide sufficient flow of thermoplastic material to fill efficiently the troughs without also building up excessive pressures while the crests of the mold blocks pass. An important feature of the present invention is the provision of means to smooth out the pressure variations occurring in moldinq between troughs 36 corresponding to ribs of the pipe and crests 37 corresponding to grooves of the pipe.

Figure 3:
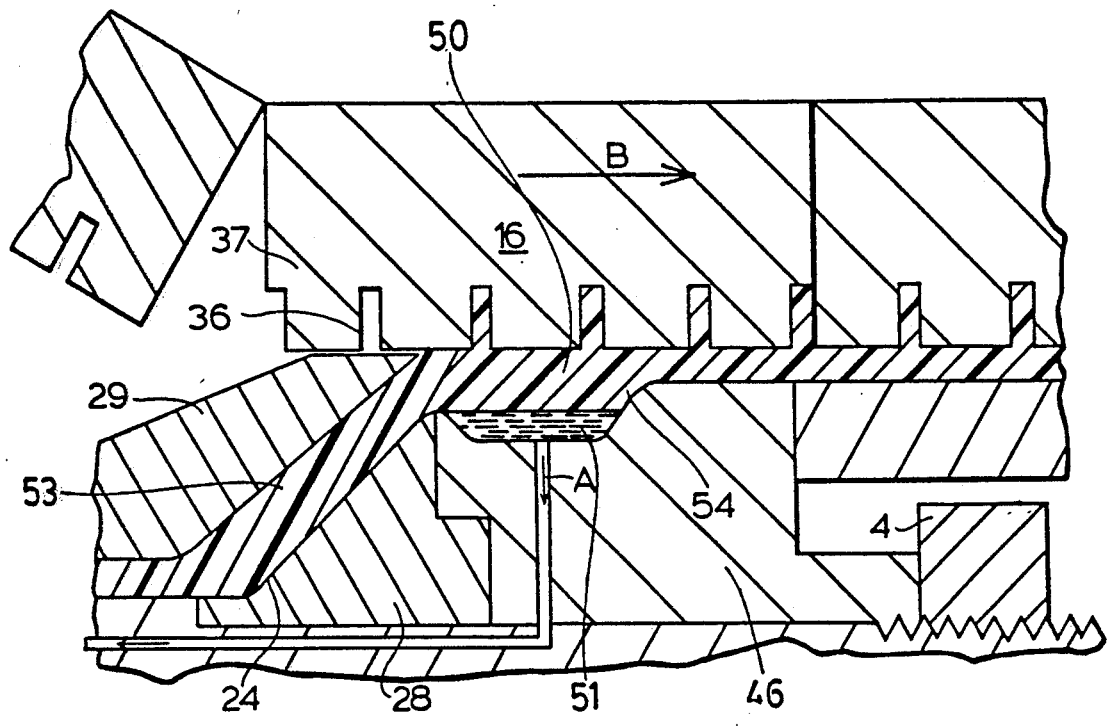
FIG. 3 is a sectional view of an enlarged detail of apparatus including one embodiment of the invention, at the start of molding of a groove of a ribbed pipe.
Figure 4:
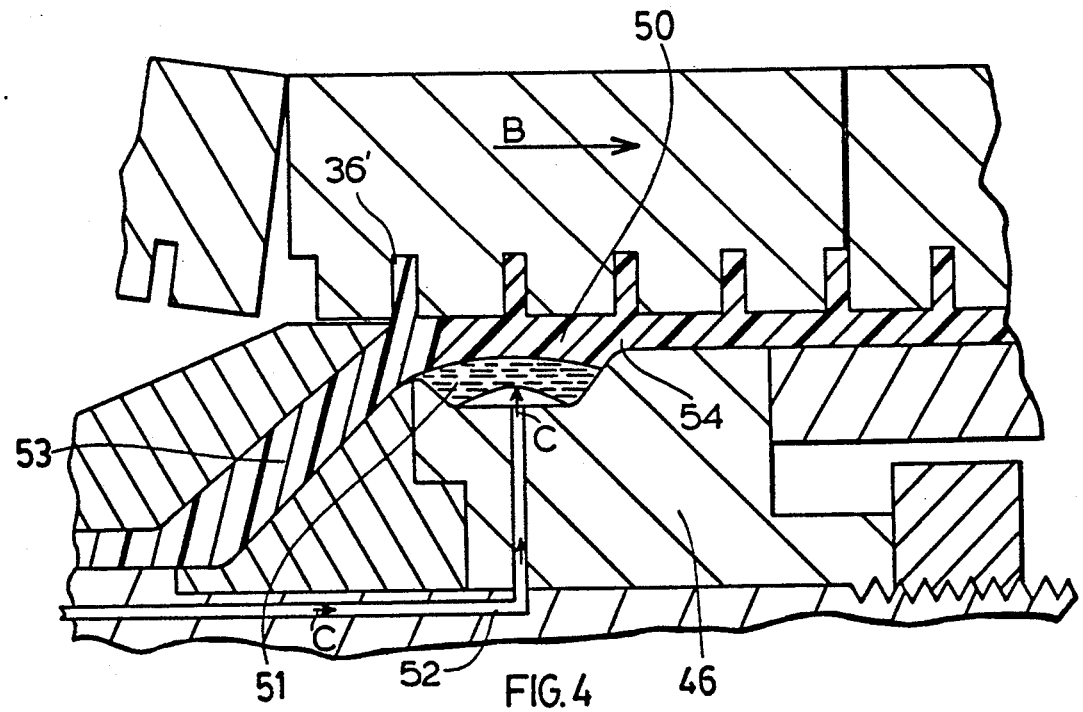
FIG. 4 is a similar sectional view of the apparatus of FIG. 3 at the start of molding of a rib of a ribbed pipe.

FIGS. 3 and 4 show one embodiment to smooth out the pressure variations. An annular compartment 50 is provided in the outer surface 48 of plug 46. This compartment is connected to a source of hydraulic or pneumatic fluid 51 through channel 52. The interface between the hydraulic or pneumatic fluid 51 with the thermoplastic material 53 effectively forms a movable wall so that the effective size of compartment 50 is variable for thermoplastic material.

In operation, when molding blocks 16 are in a position to form grooves of the resulting pipe, i.e. to fill the space between plug 46 and crest 37 with molten thermoplastic material, the back pressure exerted against the hydraulic or pneumatic system through compartment 50 and channel 52 will be high and will tend to push fluid back through channel 52 as shown by the arrows A in FIG. 3. Thus, FIG. 3 shows the state of affairs at the start of the passage of a crest 37 of the mold block 16 which is travelling in the direction of arrow B. The pressure of thermoplastic material builds and forces hydraulic fluid in the direction of arrow A to enlarge effectively compartment 50. As the mold blocks 16 advance further into the position shown in FIG. 4, pressure of the plastic material 54 is relieved as recess 36' becomes available to it. The hydraulic or pneumatic system compensates for this by flowing fluid in channel 52 into compartment 50 in the direction of arrows C to exert pressure on plastic material 53 to flow it into recess 36'. This cycle is rePeated as the mold blocks advance in the direction of the arrow B.

Figure 5:
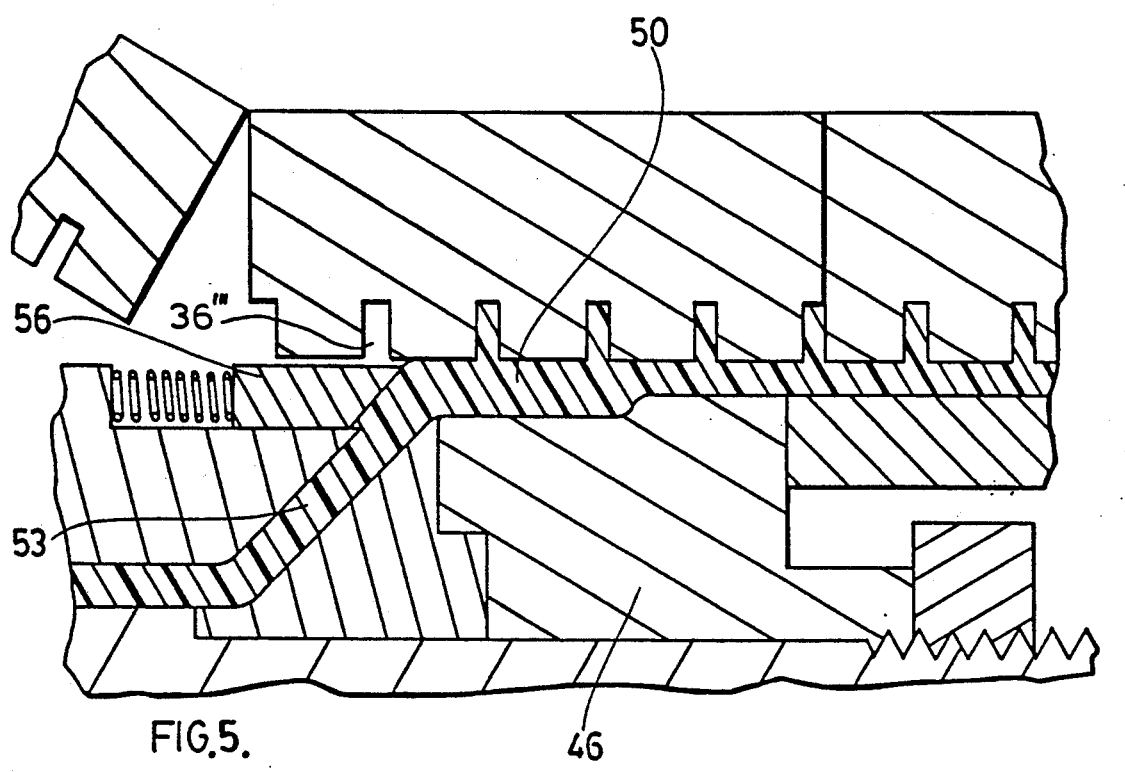
FIG. 5 is an enlarged sectional view of an enlarged detail of apparatus including another embodiment of the invention at the start of molding of a groove of a ribbed pipe.
Figure 6:
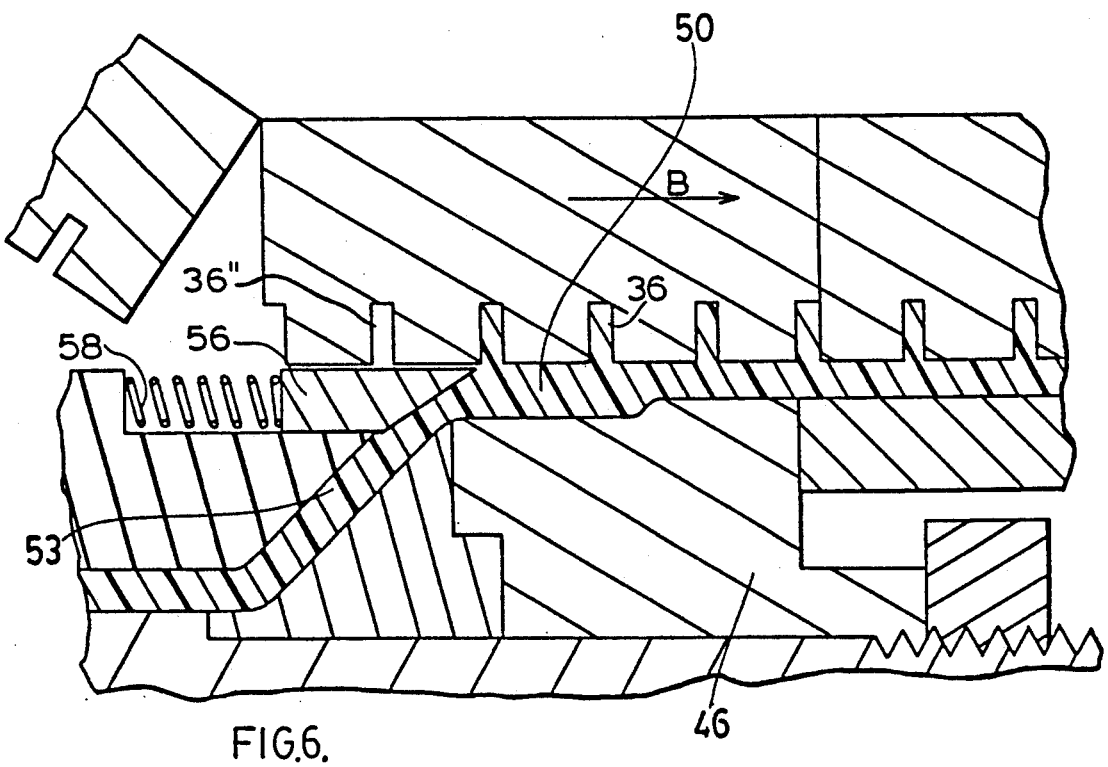
FIG. 6 is a similar sectional view of the apparatus of FIG. 5 at the start of molding of a rib of a ribbed pipe.

FIGS. 5 and 6 show a different embodiment for smoothing out the pressure variations in which outer member 28 of the extrusion nozzle 24 is formed with a separate annular tip 56 slidably connected to the body of member 28 and biassed forwardly thereof through springs 58. In operation, during formation of a rib on the tube by filling a trough 36 with thermoplastics material 54, the pressure of thermoplastics material 54 is relieved and the tip 56 is located in a forward position with springs 58 extended as shown in FIG. 6. As the mold blocks 16 advance in the direction of the arrow B, the pressure of thermoplastic material 54 increases to force tip 56 to retreat to compress springs 58. Thus the effective rate of advance of the nozzle blocks 16 is greater than their actual advance in the regions of crests 37. In this case the real movement of tip 56 results in actual variation in the size of compartment 50. When another trough 36" becomes available to thermoplastic material 34, pressure on the tip 56 relaxes, springs 58 expand, and the effective rate of advance of mold blocks 16 reduces allowing time for recess 36" to fill.

In the embodiments shown in FIGS. 3 and 4 and in FIGS. 5 and 6, the outer surface 48 of plug 46 is shown as smooth to ensure a smooth inner surface of the resulting pipe. Moreover, the surfaces of the crests 37 and troughs 36 are shown as smooth. However, the surfaces of crests 37 and troughs 36 may be patterned. Such patterning may be, for example, the provision of additional strengthening of decorative annular indentations in the crests 37 to produce annular prominences in the grooves of the formed pipe.

FIG. 7 shows a slightly different embodiment having some similarities with the embodiment of FIGS. 3 and 4. The embodiment of FIG. 7 provides helical channels 60 in the surface 48 of plug 46. When the crest 37 of a mold block 16 is passing, thermoplastic material will be forced into channels 60 communicating with both a crest 37 and an adjacent trough 36. Thus when a crest 37 of mold block 16 is passing the extrusion orifice 32, thermoplastic material may flow in channels 60 to equalize pressure between the crest 37 and an adjacent downstream trough 36. When a trough 36 passes orifice 32, there may be back flow into it from channels 60.

I claim:

1. A method for extruding seamless plastic tubing having annular solid ribs spaced one from the other by grooves along the length of such tubing with apparatus including a mold tunnel axially advancing at a substantially constant rate having radially outwardly extending troughs for molding said ribs, the troughs being axially separated one from another by crests for molding the grooves, a mandrel, a nozzle, an extrusion orifice formed between the nozzle and mandrel, and a pressure compensating chamber associated with the orifice having an open face to the troughs and crests for the discharge of said plastic material therefrom, and a chamber volume varying component, the method comprising the steps of:

extruding a thermoplastic material at a predetermined rate into an axially advancing mold tunnel, varying the effective volume of the chamber to maintain substantially uniform pressure thereby satisfying requirements for supply of thermoplastic material to compensate for pressure fluxuations and requirements for the thermoplastic material for molding the pipe ribs in the troughs and for molding the pipe grooves at the crests of the molds.

2. A method as claimed in claim 1 in which the effective volume of the chamber is allowed to vary to maintain said thermoplastic material therein at a predetermined pressure.

3. A method as claimed in claim 1 in which the volume of the chamber varies by moving a wall thereof.

4. A method as claimed in claim 3 including moving the wall of the chamber with pneumatic pressure in direct response to variation of the pressure of the thermoplastic material.

5. A method as claimed in claim 4, including biasing the wall of the chamber inwardly.

6. A method as claimed in claim 5 including associating at least one compression spring with the wall to bias the wall of the chamber.

7. A method as claimed in claim 1 in which the effective volume of said chamber is changed with application of hydraulic pressure biasing the thermoplastic material within said chamber.

8. Improvements in apparatus for producing thermoplastic tubing having annular solid ribs spaced from one another by grooves, the apparatus generally defining an axially disposed molding tunnel composed of a plurality of advanceable, articulated, interconnected mold blocks in an endless chain having a ribbed wall defined by alternating crests and troughs in the mold-defining faces for forming an outer tube surface, a forming plug for forming an inner tube surface, extrusion means including a nozzle, a mandrel, and an orifice formed therebetween disposed at the entrance to the mold tunnel for extruding a tube of thermoplastic material, and means for urging said tube outwardly against said ribbed wall, the improvement comprising:

a pressure compensating chamber extending from and fluidly connected with the orifice and open to the ribbed wall, the chamber being located to receive thermoplastic material from the extrusion means and to discharge said thermoplastic material into the mold tunnel, said pressure compensating chamber including means for varying the effective volume of the thermoplastic material to maintain a substantially uniform pressure of the thermoplastic material for molding the pipe ribs in the troughs and for molding the pipe grooves at the crests of the molds.

9. An apparatus as claimed in claim 8 in which the chamber is formed as a radially outwardly open annular recess in a forming plug for said tube, the plug being located downstream of the extrusion means.

10. An apparatus as claimed in claim 9 in which at least one fluid passageway in said plug is adapted to supply hydraulic fluid at a predetermined pressure to said chamber at a position removed from said open face thereof.

11. An apparatus as claimed in claim 9 further including a movable wall in the chamber which is movable to vary the effective volume of the chamber.

12. An apparatus as claimed in claim 11 in which the movable wall comprises an axially movable annular sleeve, whereby axial movement of said sleeve varies the volume of the chamber.

13. An apparatus as claimed in claim 12 which additionally comprises biasing means for urging said annular sleeve axially forwardly to maintain thermoplastic material contained within said chamber at a predetermined pressure.

14. An apparatus as claimed in claim 13 in which said biasing means comprises a plurality of spaced apart axially extending compression springs disposed between said nozzle and said sleeve for urging said sleeve toward said chamber.

15. Apparatus for producing thermoplastic tubing having annular solid ribs spaced from one another by grooves, the apparatus comprising a pair of complementary mold assemblies each including an endless chain of articulately interconnected mold blocks driven in synchronism with the mold blocks of the other mold assembly along a forward run and back along a return run, the mold blocks cooperating in pairs along said forward run to provide an axially advancing tubular mold tunnel about a forming plug for forming an inner tube surface, the tunnel having a wall defined by alternating crests and troughs in the mold-defining faces of the mold blocks for forming an outer tube surface, extrusion means including a nozzle, a mandrel, and an orifice therebetween disposed at the entrance to the mold tunnel for extruding a tube of thermoplastic material, and means for urging said tube outwardly against said wall, a pressure compensating chamber being provided open to said wall, said chamber being located to receive thermoplastic material from the extrusion means orifice and to discharge said thermoplastic material into said mold tunnel, and said chamber comprising at least one helical channel in the forming plug for the tube, said channel being arranged to open into more than one trough.

16. Apparatus for enhancement of uniformity in ribbed tubing produced from a molding element associated with a molding tunnel, comprising:

a pressure compensating chamber associated with a rib molding element with a non-uniform surface, said chamber being located to receive thermoplastic material from an extrusion means and to discharge said thermoplastic material into a mold tunnel, means for varying the effective volume of the thermoplastic material to maintain a substantially uniform pressure of the thermoplastic material for molding the tubing on said non-uniform surface said means being incorporated within said pressure compensating chamber.

* * * * *